(12) United States Patent
Li et al.

(10) Patent No.: US 10,160,060 B2
(45) Date of Patent: Dec. 25, 2018

(54) CRACK AND FRACTURE RESISTANT WELD JOINT AND WELDING PROCESS

(71) Applicant: GM Global Technology Operations LLC, Detroit, MI (US)

(72) Inventors: Huaxin Li, Rochester Hills, MI (US); Yujiro Suwa, Commerce Township, MI (US); Nieyuan Hai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 429 days.

(21) Appl. No.: 14/937,396

(22) Filed: Nov. 10, 2015

(65) Prior Publication Data

US 2017/0129051 A1    May 11, 2017

(51) Int. Cl.
| | |
|---|---|
| *B23K 26/242* | (2014.01) |
| *B23K 26/323* | (2014.01) |
| *B23K 26/26* | (2014.01) |
| *B23K 26/28* | (2014.01) |
| *B23K 26/282* | (2014.01) |

(Continued)

(52) U.S. Cl.
CPC ............ *B23K 26/323* (2015.10); *B23K 26/26* (2013.01); *B23K 26/28* (2013.01); *B23K 26/282* (2015.10); *B23K 2101/006* (2018.08); *B23K 2101/008* (2018.08); *B23K 2103/02* (2018.08); *B23K 2103/04* (2018.08); *B23K 2103/18* (2018.08)

(58) Field of Classification Search
CPC ............ Y10T 403/478; Y10T 403/479; B23K 26/242; B23K 26/323; B23K 2203/18; B23K 33/004; B23K 33/008; B23K 2103/18

See application file for complete search history.

(56) References Cited

U.S. PATENT DOCUMENTS

| | | | | |
|---|---|---|---|---|
| 4,000,952 A | * | 1/1977 | Bryan | B23K 33/004 251/315.01 |
| 6,381,842 B2 | * | 5/2002 | Kato | B23K 15/04 29/888.022 |
| 8,513,841 B2 | * | 8/2013 | Rotzinger | B23K 33/006 219/121.14 |

FOREIGN PATENT DOCUMENTS

| | | | |
|---|---|---|---|
| CN | 103596721 A | 2/2014 | |
| DE | 10 2004 015 440 | * 10/2005 | B23K 33/00 |

(Continued)

OTHER PUBLICATIONS worldwide.espacenet.com translation of DE 102004019012. Mar. 17, 2017.*

(Continued)

*Primary Examiner* — Michael P Ferguson

(57) ABSTRACT

A weld joint includes a first component of a first material and a second component of a ductile second material dissimilar from the first material. A planar face of the first component abuts a planar face of the second component. A "V" shaped weld groove is created in the first component defining a first groove end where a substantially planar groove face of the first component intersects a plane defined by the planar face of the second component below an end face of the second component. A slot is created below the groove end in the planar face of the second component having a closed end facing toward the end face of the second component and extending away from the planar face of the second component at an angle measured with respect to a central longitudinal axis of the slot.

9 Claims, 5 Drawing Sheets

(51) Int. Cl.
  *B23K 103/18* (2006.01)
  *B23K 101/00* (2006.01)
  *B23K 103/02* (2006.01)
  *B23K 103/04* (2006.01)

(56) References Cited

FOREIGN PATENT DOCUMENTS

| | | | | |
|---|---|---|---|---|
| DE | 10 2004 019 012 | * | 11/2005 | ................ F02F 3/00 |
| DE | 10 2014 000 263 | * | 7/2015 | ............. B23K 31/02 |
| GB | 972338 | * | 10/1964 | ........... B23K 33/004 |
| WO | WO 2012/164701 | * | 12/2012 | ............. B23K 31/00 |

OTHER PUBLICATIONS worldwide.espacenet.com translation of WO 2012164701. Mar. 17, 2017.*

* cited by examiner

CRACK AND FRACTURE RESISTANT WELD JOINT AND WELDING PROCESS

FIELD

The present disclosure relates to weld joint geometry, and more specifically, relates to crack and fracture resistant weld joint designs and processes for dissimilar metal welding.

BACKGROUND

The statements in this section merely provide background information related to the present disclosure and may or may not constitute prior art.

In a typical motor vehicle, certain components have historically been fastened together, such as for example a differential ring gear and a differential carrier. The choice of fastening such components has historically been made due to the difference in materials of the two items. The ring gear is typically provided as a gear steel and the differential carrier, due to its complex geometry, is typically provided as cast iron. Attempts have been made to reduce the weight and assembly cost of this assembly by welding these two components together. Because of the physical and metallurgical property differences between these alloys, as the weld joint rapidly cools following welding, residual stresses at a joining line between the material of the first and the second components and therefore at the location of the weld root may induce weld joint cracking due to welding induced brittle metallurgical microstructure and residual stress, which normally initiates at the weld root and propagates along the ductile cast iron material weld heat affected zone (HAZ). The higher the base ductile iron strength, the more sensitive the weld joint is to develop weld root cracks in the ductile iron HAZ. Such weld root cracks may result in weld joint premature failure.

Accordingly, there is a need for a weld joint design that mitigates against weld root cracks and joint fracture when welding components with different metallurgical and physical properties.

SUMMARY

According to several aspects of the present disclosure, a weld joint includes a first component of a first material and a second component of a ductile iron second material dissimilar from the first material. A planar face of the first component abuts a planar face of the second component. A "V" or half "V" shaped weld groove is created in the first component defining a first groove end where a substantially planar groove face of the first component intersects a plane defined by the planar face of the second component below an end face of the second component. A slot is created below the groove end in the planar face of the second component having a closed end facing toward the end face of the second component.

According to further aspects, the slot has a depth ranging between approximately 2.0 mm to 6.0 mm.

According to further aspects, the depth of the slot is determined where a central longitudinal axis of the slot intersects with a plane defined by the planar face of the second component.

According to further aspects, the slot has a width ranging between approximately 1.0 mm to 3.0 mm.

According to further aspects, the slot extends from the planar face of the second component at an angle ranging between approximately 10 degrees to approximately 70 degrees, measured with respect to a central longitudinal axis of the slot.

According to further aspects, the groove face is oriented at an angle $\alpha$ with respect to the face of the second component, the angle $\alpha$ varying between approximately 10 degrees to approximately 50 degrees.

According to further aspects, a second "V" or half "V" shaped weld groove created in the second component defines a second groove end where a substantially planar groove face of the second component intersects a plane oriented substantially perpendicular to the end face of the second component.

According to further aspects, the planar groove face of the second component is oriented at an angle $\delta$ with respect to the plane oriented substantially perpendicular to an end face of the second component, the angle $\delta$ ranging between approximately 5 degrees to approximately 45 degrees.

According to further aspects, an angular wall joins the first groove end to the second groove end.

According to further aspects, the angular wall is oriented at an angle $\varepsilon$ with respect to a plane intersecting the second groove end and oriented parallel to the end face of the second component.

According to further aspects, the first groove end is positioned at a first depth with respect to the component end face and the second groove end is positioned at a second depth with respect to the component end face; wherein the second depth is greater than the first depth, the second groove end thereby defining a low point of the weld joint.

According to further aspects, the second groove end is positioned entirely in the second component.

According to further aspects, the second groove end is positively displaced into the second component at a dimension ranging between approximately 3.0 mm to 3.5 mm measured from the planar face of the second component.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the present disclosure. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
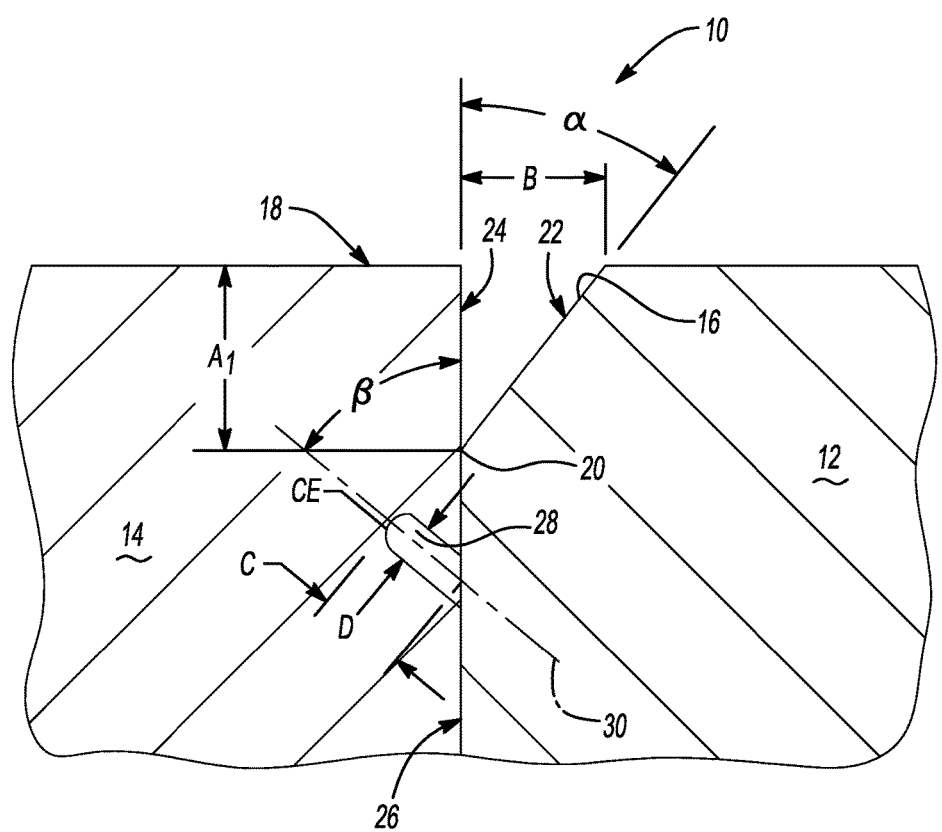
FIG. 1 is a cross sectional front elevational view of a weld joint in accordance with one aspect of the present disclosure.

Referring now to the drawings, a weld joint of a first aspect of the present disclosure is shown in FIG. 1 at 10. The weld joint 10 is created between components having different material properties, such as a first component 12 made for example of steel material such as a gear steel, and a second component 14 made for example of a cast iron such as a ductile iron. The first and second components 12, 14 are made of dissimilar materials, the "V" or half "V" shaped weld groove is filled up with a filler metal that contains a minimum of 18% nickel, therefore a connection between the first and the second components 12, 14 made such as by a welding operation defines a dissimilar metal weld joint.

To create the weld joint 10 a half "V" shaped weld groove 16 is initially created by removing material only from the first component 12. This can be accomplished such as by a cutting or grinding operation to remove material of the first component 12 downward from a plane defined by a component end face 18 of the second component 14 to a first groove end 20 defined where a substantially planar groove face 22 created in the first component 12 intersects a plane defined by an un-modified planar face 24 of the second component 14. According to several aspects, the groove face 22 is oriented at an angle α with respect to an un-modified planar face 24 of the second component 14. Angle α can vary between approximately 10 degrees to approximately 50 degrees. According to several aspects, the face 24 of the second component 14 generally abuts a planar face 26 of the first component 12, except where material is removed to create the "V" shaped weld groove 16.

The half "V" shaped weld groove 16 has a depth "$A_1$" measured at the first groove end 20 below or opposite to the end face 18, and has a maximum width "B" measured from a plane defined by the junction of the faces 24, 26 at the elevation of the end face 18. According to several aspects, the depth "$A_1$" can vary between approximately 2.0 mm to 10.0 mm. Independently from the half "V" shaped weld groove 16, a groove or weld root stress relief slot 28 is created in the ductile material of the second component 14 on an opposite facing side of the first groove end 20 with respect to the end face 18, with a closed end "CE" of the slot 28 directed upward toward the end face 18. The slot 28 has a depth "C" that can range between approximately 2.0 mm to 6.0 mm, and has a diameter or width "D" that can range between approximately 1.0 mm to 3.0 mm. The slot 28 extends from the face 24 into the second component 14 at an angle β directed upward (as viewed in FIG. 1) toward the end face 18, which according to several aspects defines an angle ranging between approximately 10 degrees up to approximately 70 degrees, measured with respect to a central longitudinal axis 30 of the slot 28. The depth "C" of the slot 28 is measured from where the longitudinal axis 30 intersects with the plane defined by the face 24.

Referring to FIG. 2 and again to FIG. 1, a completed weld 32 joining the first component 12 to the second component 14 is created by fusing a weld filler material in the half "V" shaped weld groove 16 using a laser welding beam or arc welding gun hereinafter referred to generally as a welding power source 34. According to several aspects, the welding power source 34 directs an arc, a plasma beam or a laser beam, hereinafter referred to generally as laser beam 36 toward the first groove end 20. The laser beam 36 is angularly oriented with respect to the planar face 24 of the second component 14. According to several aspects, the laser beam 36 is oriented substantially parallel to the groove face 22. According to further aspects, the laser beam 36 is oriented at the angle α ranging between approximately 5 degrees to approximately 40 degrees with respect to the plane defined by the planar face 24 of the second component 14.

The angular orientation α of the laser beam 36 ensures that a HAF 38 created proximate to the groove face 22 of the first component 12 and a HAF 40 created proximate to the face 24 of the second component 14 combine to create a weld root 42 which is positioned within the second component 14. The weld root 42 is located in the second component 14 at an extension dimension "E" of approximately 2.0 mm to 5.0 mm measured from the face 24 of the second component 14. The weld root 42 is therefore positioned within the material of the second component 14, and according to several aspects therefore within the ductile material, at a depth "$A_2$" which is at a depth into the second component 14 greater than a depth "$A_3$" at a crossover point (CP1) defined where the weld 32 crosses a joining line at the intersection plane of face 24 and face 26 between the material of the first component 12 and the material of the second component 14. The depth "$A_2$" of the weld root 42 is therefore greater than both depth "$A_1$" and depth "$A_3$". Stresses induced in the first component 12 in a first direction 44 and stresses induced in the second component 14 in an opposite second direction 46 tending to deform the assembly of components 12, 14 are partially relieved by a path through the slot 28 and the by the location of the weld root 42, which directs crack inducing stress lines 48 toward CP1 and away from the weld root, where the weld 32 has high cracking resistance due to its high ductility, crossing the joining line between the material of the first and the second components 12, 14 thereby mitigating against initiation of a weld root crack in the ductile iron HAZ. The location and the design of the weld root 42 of the present disclosure therefore prevents crack initiation or propagation along the second component 14.

Figure 2:
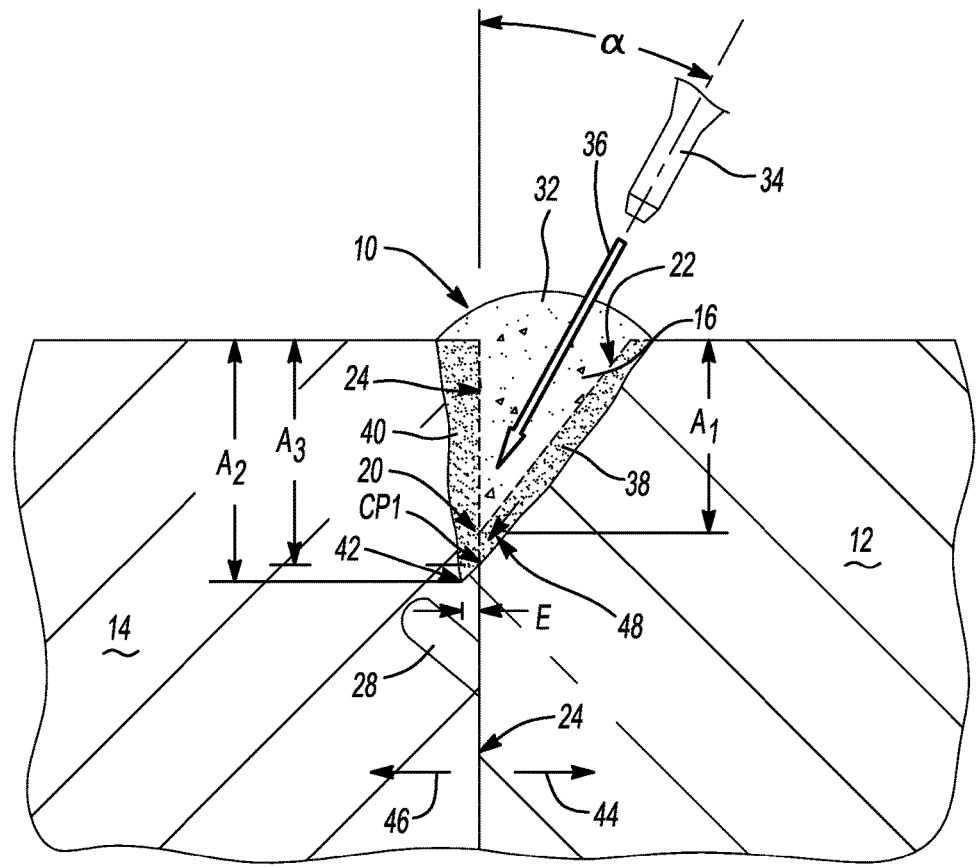
FIG. 2 is a cross sectional front elevational view of a completed weld using the weld joint of FIG. 1.

Referring further to FIG. 3 and again to FIGS. 1-2, a weld joint of a second aspect of the present disclosure is shown at 50. Similar to weld joint 10, the weld joint 50 is created between components having different material characteristics, such as a first component 52 made for example of a gear steel, and a second component 54 made for example of a ductile cast iron material. The first and second components 52, 54 are made of dissimilar materials, therefore a connection between the first and the second components 52, 54 made such as by a welding operation defines a dissimilar metal weld joint.

To create the weld joint 50 a modified "V" shaped weld groove 56 is initially created by removing material from each of the first component 52 and the second component 54. This can be accomplished such as by a cutting or grinding operation to remove material from a component end face 58 of the first component 52 down to a groove end 60 defined where a substantially planar groove face 62 created in the first component 52 intersects a plane 64 defined by abutting first and second faces 66, 68 of the first component 52 and the second component 54. According to several aspects the groove face 62 is oriented at an angle γ with respect to the plane 64, which can be substantially equal to the angle α shown and described with respect to FIG. 1. According to several aspects the groove end 60 is located at substantially the same position as the groove end 20 of the weld joint 10 which allows the geometry of the weld joint 10 to be further modified create the weld joint 50.

As noted above, the modified "V" shaped weld groove 56 also results from removal of material from the second component 54, creating a substantially planar groove face 70 angularly oriented with respect to a plane 72 vertically extending through a second groove end 74, with plane 72 oriented substantially perpendicular to the end face 18 and parallel to the plane 64. According to several aspects the groove face 70 is oriented at an angle δ with respect to the plane 72, ranging between approximately 5 degrees to approximately 45 degrees. An angular wall 76 joins the groove end 60 to the second groove end 74. According to several aspects the angular wall 76 is oriented at an angle ε with respect to a plane 78 intersecting the second groove end 74 and oriented parallel to a component end face 88 of the second component 54. According to several aspects angle ε is less than an angle μ defined between the groove face 62 and a plane 79 intersecting the groove end 60 and oriented parallel to the component end face 58. Angle μ is a complimentary angle to angle γ.

The groove end 60 is positioned at a depth "F" with respect to the component end face 58. The second groove end 74 is positioned at a depth "G" with respect to the component end face 58. According to several aspects, depth "G" is greater than the depth "F", therefore the second groove end 74 defines a low point of the modified "V" shaped weld groove 56. The second groove end 74 is also positively displaced into the second component 54 at an extension dimension "H" of approximately 1.0 mm to 6.0 mm measured from the planar face 68 of the second component 54.

Similar to the slot 28 proximate to the weld groove 22, independently from the "V" shaped weld groove 56, a groove or weld root stress relief slot 80 is created on an opposite facing side of the second groove end 74 with respect to the end face 84. The slot 80 can have a depth "J" ranging between approximately 2.0 mm to 6.0 mm, and can have a diameter or width "K" ranging between approximately 1.0 mm to 3.0 mm. The slot 80 is created in the ductile material of the second component 54, and extends from the face 68 into the second component 54 at an angle θ, which according to several aspects defines an angle ranging between approximately 10 degrees up to approximately 70 degrees, measured with respect to a central longitudinal axis 82 of the slot 80 and the plane 64. The depth "J" of the slot 80 is measured from where the longitudinal axis 82 intersects with the plane defined by the face 68. Stresses induced in the first component 52 in a first direction 86 and stresses induced in the second component 54 in an opposite second direction 88 tending to deform the assembly of the first and second components 52, 54 are partially relieved by the slot 80, as well as the geometry of the "V" shaped weld groove 56, as will be discussed in greater detail in reference to FIG. 4.

Figure 3:
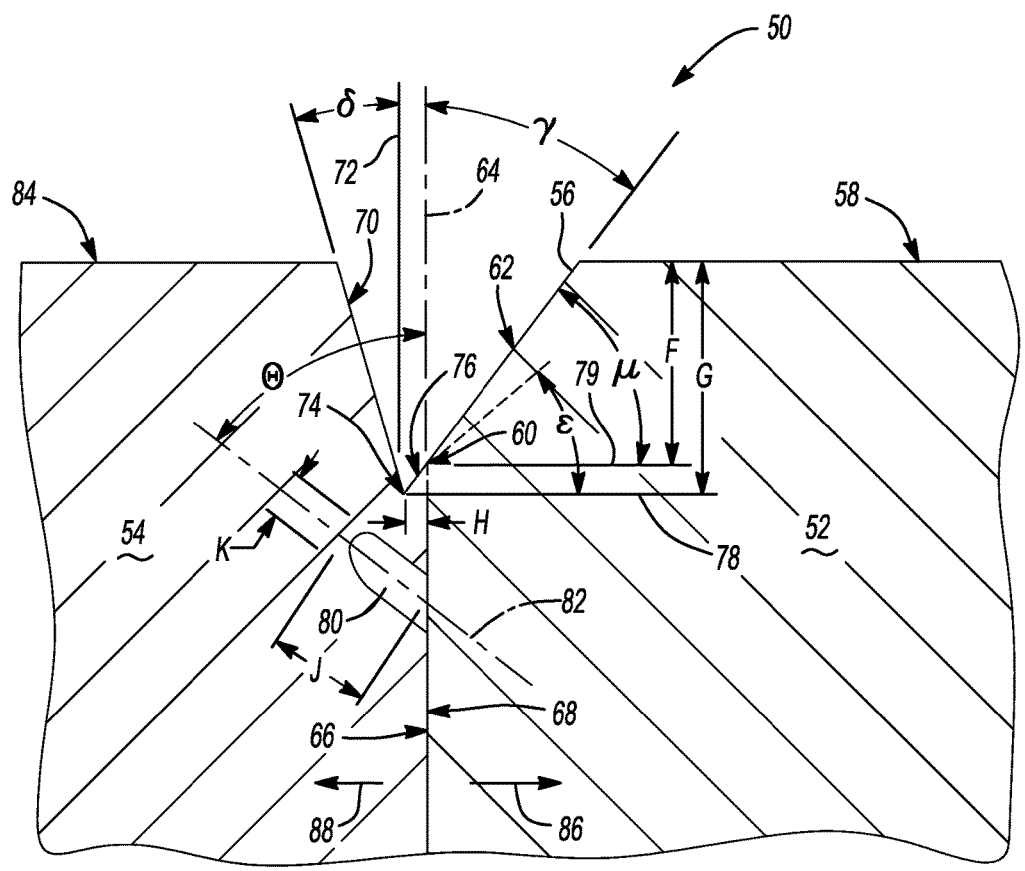
FIG. 3 is a cross sectional front elevational view of a weld joint in accordance with another aspect of the present disclosure.

Referring now to FIG. 4 and again to FIGS. 1-3, a completed weld 90 joining the first component 52 to the second component 54 is created by fusing a weld filler material in the modified "V" shaped weld groove 56 using a welding source similar to the welding power source 34, such as a laser beam. According to several aspects, laser beam 92 is directed toward the second groove end 74. The laser beam 92 is angularly oriented with respect to the planar groove face 70 of the second component 54. According to several aspects, the laser beam 92 may be oriented substantially parallel to the groove face 62. According to further aspects, the laser beam 92 can be oriented at a minimum angle ω of approximately 10 degrees with respect to the plane 72 extending through the second groove end 74.

The angular orientation ω of the laser beam 92 and the position of the second groove end 74 extended into the second component 54 ensures that a HAF 94 created proximate to the groove face 62 of the first component 52 and a HAF 96 created proximate to the groove face 70 of the second component 54 combine to create a weld root 98 located substantially within the second component 54. The weld root 98 is positioned in the second component 54 at a minimum of the extension dimension "H" (described in reference to FIG. 3) of approximately 1.0 mm to 6.0 mm measured from the face 68 of the second component 54. Similar to weld 32 discussed above with respect to FIG. 2, a root of the weld 90, defined as the weld root 98, therefore falls within the material of the second component 54, and according to several aspects therefore within the ductile material, at a location deeper into the second component 54 than a crossover point (CP2) where the weld 90 crosses a joining line (at an intersection plane of the face 66 and the face 68) between the material of the first component 52 and the material of the second component 54.

Figure 4:
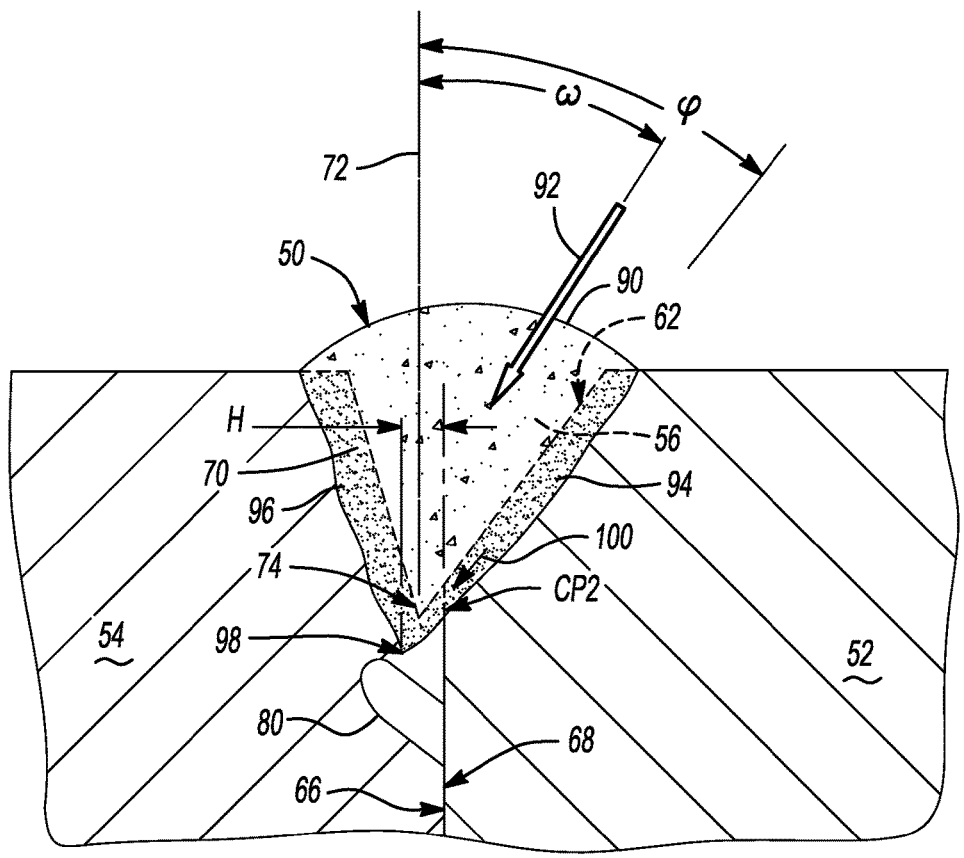
FIG. 4 is a cross sectional front elevational view of a completed weld using the weld joint design of FIG. 2.

With continuing reference to FIGS. 3 and 4, because of the position of the weld root 98 and the crossover point CP2, stresses induced in the first component 52 in the first direction 86 and stresses induced in the second component 54 in the opposite second direction 88 tending to deform the assembly of components 52, 54 are partially relieved by the slot 80 and the location of the weld root 98, which directs crack inducing stress lines 100 toward CP1 and away from the weld root, where the weld 50 has high cracking resistance due to its high ductility, crosses the joining lines between the material of the first and the second components 52, 54 thereby mitigating against initiation of a weld root crack in the ductile iron HAZ. The location and the design of the weld root 98 of the present disclosure therefore prevents crack initiation or propagation along the second component 54.

Figure 5:
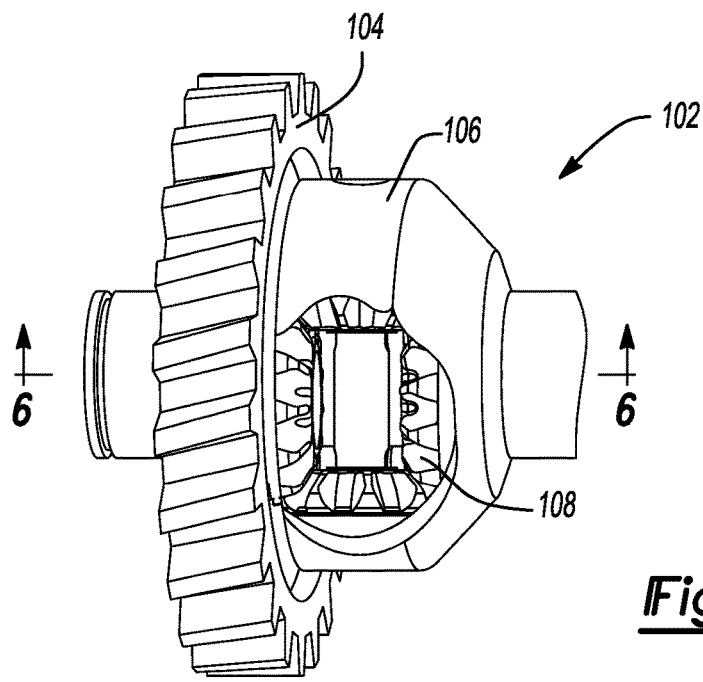
FIG. 5 is a front left perspective view of a differential assembly welded using weld joints in accordance with the principles of the present disclosure.

Referring to FIG. 5 and again to FIGS. 1-4, in an exemplary application, weld joint designs of the present disclosure can be used to join dissimilar metal components of a differential assembly 102. The differential assembly 102 includes a ring gear 104 welded to a carrier 106. The ring gear 104 can be provided of a gear steel. The carrier 106 due to it complex geometry may be provided of a ductile cast iron material to provide internal space to incorporate an internal planetary gear assembly 108.

Figure 6:
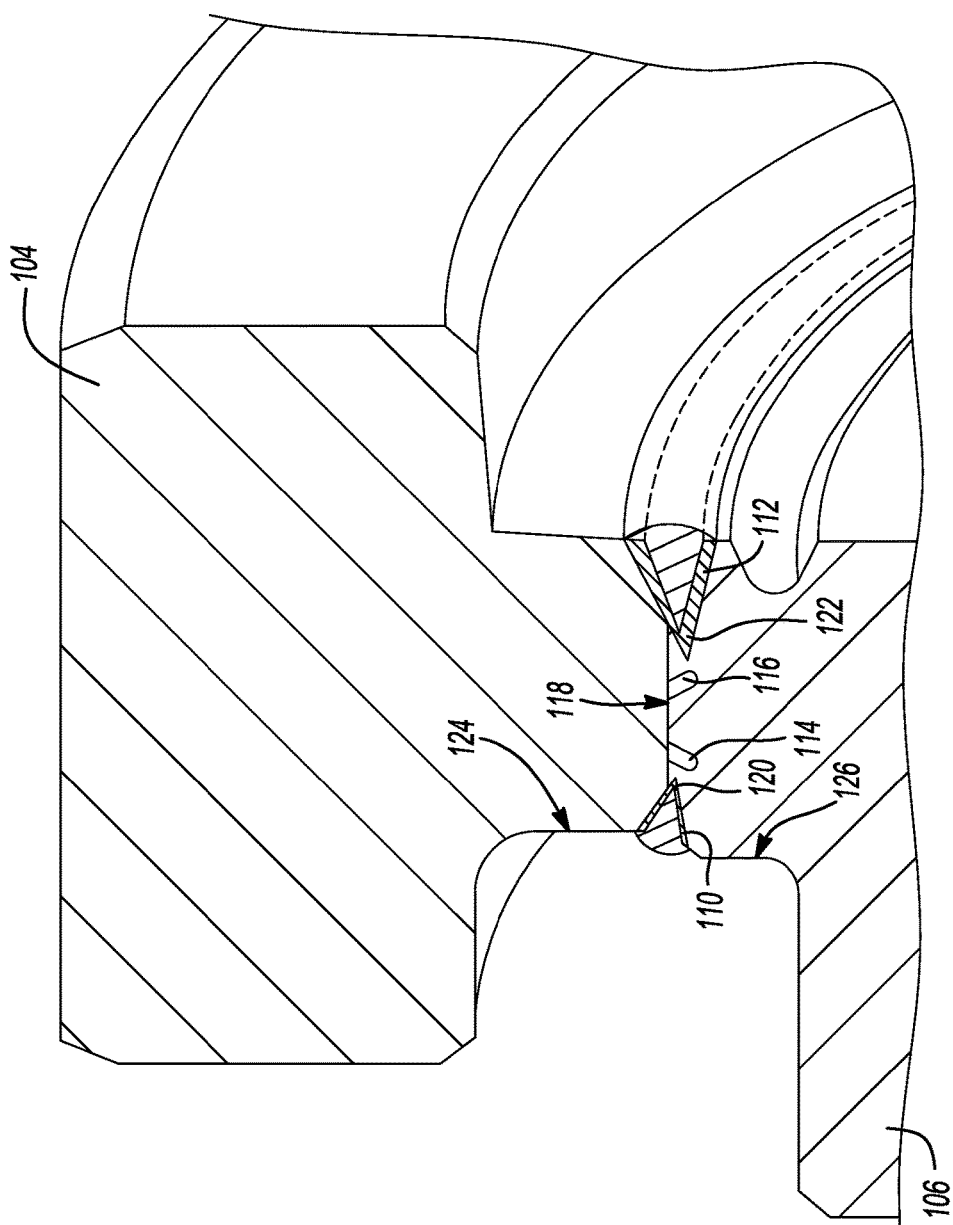
FIG. 6 is a cross sectional front elevational view taken at section 6 of FIG. 5.

Referring to FIG. 6 and again to FIGS. 1-5, to weld the ring gear 104 to the carrier 106, each of the weld joint 10 used to create a finished weld 110, and the weld joint 50 used to create a finished weld 112 can be used. In addition, a stress relief slot 114, similar in configuration to the stress relief slot 28 is positioned proximate to the finished weld 110. A stress relief cavity 116, formed in a semi-circular shape in lieu of the elongated bore shape of the stress relief slot 28 is positioned proximate to the finished weld 112. Both the stress relief slot 114 and the stress relief cavity 116 are created in a face 118 of the carrier 106. A weld root 120 similar to the weld root 42, and a weld root 122 similar to the weld root 98, are also both located within the ductile material of the carrier 106. It is noted that surfaces of adjacent components do not have to be co-planar for application of the weld joints 10, 50 of the present disclosure. For example a surface 124 of the ring gear 104 is displaced away from (not in co-planar alignment with respect to) a surface 126 of the carrier 106.

The description of the present disclosure is merely exemplary in nature and variations that do not depart from the gist of the invention are intended to be within the scope of the invention. Such variations are not to be regarded as a departure from the spirit and scope of the invention.

What is claimed is:

1. A weld joint, comprising:

a first component of a first material and a second component of a ductile second material dissimilar from the first material, a planar face of the first component abutting a planar face of the second component such that an end face of the first component is adjacent and end face of the second component;

a first fillet weld groove created in the planar face of the first component by removing material from the first component, the first weld groove comprising a substantially planar groove face of the first component which intersects a plane defined by the planar face of the second component and defining a first groove end, the first groove end positioned at a depth measured from the end faces of the first and second components, the end faces of the first and second components oriented substantially perpendicular to the planar faces of the first component and the second component;

a second V-shaped weld groove created in the planar face of the second component, the second weld groove comprising a substantially planar groove face of the second component spaced from the planar face of the second component and which intersects a plane oriented substantially perpendicular to the end face of the second component and defining a second groove end;

the second weld groove further comprising an angular wall intersecting the planar face of the second component, extending from the first groove end and joining the first groove end to the second groove end, the angular wall oriented at an angle $\varepsilon$ with respect to a plane intersecting the second groove end and oriented parallel to the end face of the second component, the angle being less than an angle $\mu$ defined between the groove face of the first component and a plane intersecting the first groove end and parallel to the end face of the first component; and a slot created below the second groove end in the planar face of the second component, the slot having a closed end facing toward the end face of the second component.

2. The weld joint of claim 1, wherein the slot has a depth ranging between approximately 2.0 mm to 6.0 mm.

3. The weld joint of claim 2, wherein the depth of the slot is determined where a central longitudinal axis of the slot intersects with a plane defined by the planar face of the second component.

4. The weld joint of claim 1, wherein the slot has a width ranging between approximately 1.0 mm to 3.0 mm.

5. The weld joint of claim 1, wherein the slot extends from the planar face of the second component at an angle ranging between approximately 10 degrees to approximately 70 degrees, measured with respect to a central longitudinal axis of the slot.

6. The weld joint of claim 1, wherein the groove face of the first component is oriented at an angle $\alpha$ with respect to the planar face of the second component, the angle $\alpha$ varying between approximately 10 degrees to approximately 50 degrees.

7. The weld joint of claim 1, wherein the planar groove face of the second component is oriented at an angle $\delta$ with respect to the plane oriented substantially perpendicular to the end face of the second component, the angle $\delta$ ranging between approximately 5 degrees to approximately 45 degrees.

8. The weld joint of claim 1, wherein:

the first groove end is positioned at a first depth with respect to the second component end face; and the second groove end is positioned at a second depth with respect to the second component end face;

wherein the second depth is greater than the first depth, the second groove end thereby defining a low point of the weld joint.

9. The weld joint of claim 8, wherein the second groove end is positively displaced into the second component at a dimension ranging between approximately 3.0 mm to 3.5 mm measured from the planar face of the second component.

* * * * *